(Model.)

2 Sheets—Sheet 1.

C. R. HEIZMANN.
Apple Parer, Corer and Slicer.

No. 243,254.  Patented June 21, 1881.

Worm Released

Worm Engaged

Witnesses
Frank P Kinsey
Daniel C Heller

Inventor
C Raymond Heizman
by Thomas P Kinsey
Atty

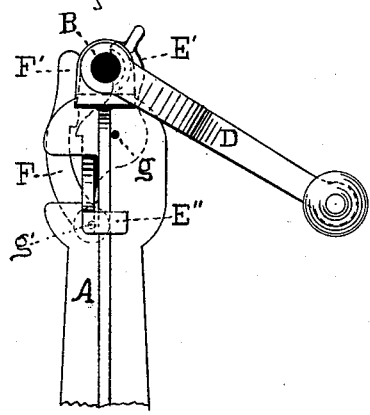

UNITED STATES PATENT OFFICE.

C. RAYMOND HEIZMANN, OF READING, PENNSYLVANIA, ASSIGNOR TO PENN HARDWARE COMPANY, OF SAME PLACE.

APPLE PARER, CORER, AND SLICER.

SPECIFICATION forming part of Letters Patent No. 243,254, dated June 21, 1881.

Application filed February 25, 1881. (Model.)

*To all whom it may concern:*

Be it known that I, C. RAYMOND HEIZMANN, of the city of Reading, county of Berks, State of Pennsylvania, have invented a new and useful Improvement in Fruit-Parers, of which the following is a specification.

This improvement relates more particularly to that class of parers upon which no gearing is employed, the fruit being revolved by the direct motion of the crank on the fork-shaft, the fork-shaft, and with it the fruit impaled upon the fork, being fed past the knife by a worm or coarse-pitch screw formed upon or sunken in the body of the shaft.

Figure 1:
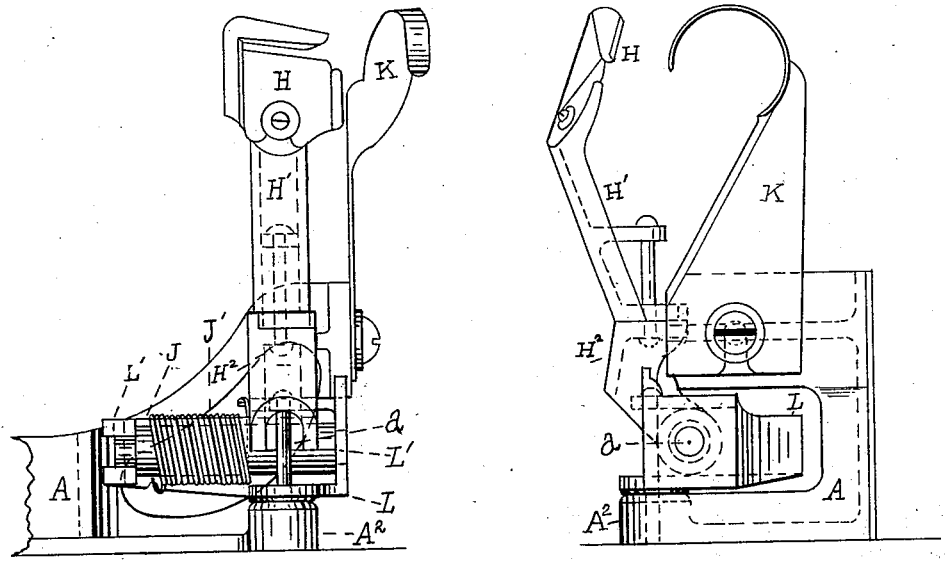
Figure 2:
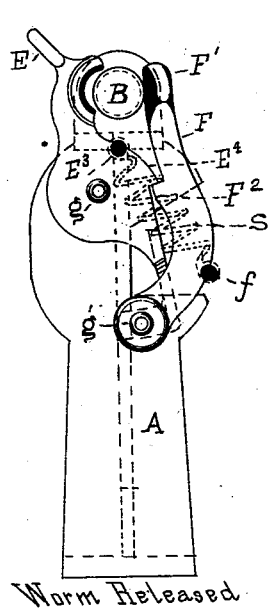
Figure 3:
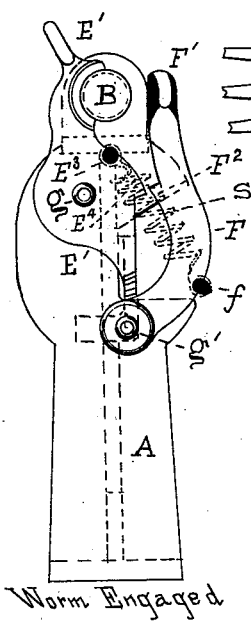
Figure 3:
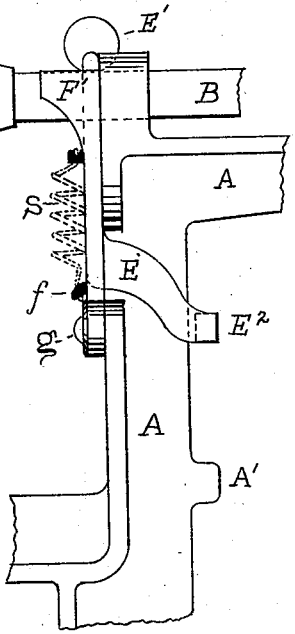

Referring to the drawings forming part of this specification, in which similar letters refer to similar parts, Figure 1, Sheet 1, is a front and end elevation, on an enlarged scale, of the paring-knife, arm, and table, together with the slicer and corer; Fig. 2, Sheet 1, enlarged views of the automatic engaging and disengaging device, Fig. 3, Sheet 1, being a side elevation of the same on an enlarged scale. Fig. 4, Sheet 2, is a view of the parer complete; Fig. 5, Sheet 2, an elevation of the crank end.

A represents the standard or frame; $A^2$, a table for paring-knife support; B, the fork-shaft, having a sunken coarse-pitch feed-screw traced upon it; C, the fork, having a cone-head; D, the crank for actuating the shaft.

E is the trigger or pawl, having a thumb-head, $E'$, and tail $E^2$, spring hook or stud $E^3$, and pivot $g$, and provided with an incline catch, $E^4$.

F is the dog for retention in position of the trigger or pawl E. It has a coned head, $F'$, inclined catch $F^2$, spring-stud $f$, and a pivot, $g'$.

H represents the paring-knife, having a bent arm or standard, $H'$, provided with a foot, $H^2$, and shaft J, upon which a spring, $J'$, is wound, and so adjusted with relation to the foot $H^2$ that it shall, while permitting the recession of the knife, retain it in contact with the surface of the fruit to be pared.

K is the coring and slicing knife.

L is a turn-table mounted upon the bed $A^2$ of the frame A, upon which it revolves on a pivot, $a$, and has upon its upper face standards $L'$ $L'$, for the support of the knife-shaft J.

In all parers of this class which have come under my notice it is necessary to use both hands to release the dog or pawl working on the worm, or in the coarse screw on the body of the fork-shaft, before the shaft could be retracted for the reception of a fresh apple. This objection I remove by the arrangement of the trigger E and pawl or dog F on the front face of the standard and pivoted thereto, and which are made to act in concert by the tension of the spiral spring S, attached to the trigger E at $E^4$ and to the dog F at $f$. The flange of the standard is cut away on the front side down to the feather, to give clearance to the tail $E^2$ of the trigger as it passes from the front of the flange to the rear of the feather, where it may be struck at the proper time by the bent handle D of the fork-shaft B.

The operation of the device is as follows: The head $E'$, when in contact with the fork-shaft B, fits in the screw-thread upon the same, the inclined catch $E^4$ being released from the dog-catch $F^2$. While in this position the revolution of the fork-shaft will project it forward toward the corer and slicer K until the crank-arm strikes upon the tail $E^2$ of the trigger E, and is brought to rest by the resistance of the same to further movement. The striking of the tail of the trigger throws the head $E'$ out of gear with the worm or screw, at the same time causing the incline $E^4$ to ride over and lock with the incline $F^2$ of the dog F, the same being kept in close contact by the retractile power of the spring S, secured to the stud $E^3$ on trigger E, and stud $f$ on dog F. This operation of the device has also brought the head $F'$ in contact with the surface of the fork-shaft B, and has released the same, so that it can be moved longitudinally in its bearings. The shaft B has the back of the fork-head C formed coned or inclined, and the head $F'$ of the dog F is correspondingly inclined. Therefore on retracting the shaft the cone-head C enters the cone of $F'$ and presses it away from the shaft, disengaging the inclined catches $E^4$ and $F^2$, the incline $E^4$ riding upon $F^2$. The turning of the crank being resumed the shaft is again projected forward, as described.

It will be noticed that the hand is not removed from the crank D, and the left hand is at liberty to place the fruit for paring, the operation thus being continuous.

I make no claim to an apple-parer shaft having both a longitudinal and rotatory movement, nor to a spring-actuated nut working in combination therewith, nor to a knife, corer, and slicer, nor to a paring-knife with an open inclined throat, nor to a stop rigidly attached to the frame to arrest the motion of the handle combined upon an apple-parer frame; neither do I claim a turn-table *per se* for carrying the knife, as they are all old and well-known devices for the purpose described.

My improvement makes a very trifling addition to the cost, but furnishes a paring-machine of increased range of application, and which is automatically set and released while operating the same.

Having described my invention, what I claim as new, and desire to secure by Letters Patent, is as follows:

1. In combination with an apple-parer frame, A, a pawl or trigger, E, provided with a crescent head, E', tail $E^2$, stud $E^3$, inclined peripheral catch $E^4$, pivot $g$, and spiral spring S, in combination with the fork-shaft B during the operation of paring by the contact of crescent head E' with the worm or screw on the same, substantially as shown, and for the purpose described.

2. The dog F, provided with coned head F', inclined catch $F^2$, stud $f$, and pivoted to frame A by pivot $g'$, arranged to operate in combination with the trigger E by the spiral spring S, substantially as and for the purpose specified.

3. A rear truncated fork-head, C, intermittingly operating, in combination with the cone-head F' of the dog F, to lock the pawl or trigger E with the worm or screw of the fork-shaft B, as shown, and for the purpose described.

4. The intermittent combination of the bent arm of the crank D with the tail $E^2$ of the trigger E, for the release of the trigger-head E' from the worm or screw of the fork-shaft B, substantially as shown, and for the purpose set forth.

C. RAYMOND HEIZMANN.

Witnesses:
H. A. ZIEBER,
A. B. HARMER.